A. M. WALDEN.
GEAR FOR CHILDREN'S CARRIAGES.
APPLICATION FILED DEC. 3, 1910.

1,023,692.

Patented Apr. 16, 1912.
2 SHEETS—SHEET 1.

Witnesses

Inventor
Arthur M. Walden.
By Victor J. Evans.
Attorney

A. M. WALDEN.
GEAR FOR CHILDREN'S CARRIAGES.
APPLICATION FILED DEC. 3, 1910.

1,023,692.

Patented Apr. 16, 1912.

2 SHEETS—SHEET 2.

Witnesses

Inventor
Arthur M. Walden.
By Victor J. Evans
Attorney

COLUMBIA PLANOGRAPH CO., WASHINGTON, D. C.

UNITED STATES PATENT OFFICE.

ARTHUR M. WALDEN, OF HICKSVILLE, NEW YORK.

GEAR FOR CHILDREN'S CARRIAGES.

1,023,692.  Specification of Letters Patent.  Patented Apr. 16, 1912.

Application filed December 3, 1910. Serial No. 595,419.

*To all whom it may concern:*

Be it known that I, ARTHUR M. WALDEN, a citizen of the United States, residing at Hicksville, in the county of Nassau and State of New York, have invented new and useful Improvements in Gear for Children's Carriages, of which the following is a specification.

This invention relates to improvements in children's carriages or go-carts and is primarily directed to the running gear thereof, and one of the objects of the invention is to provide a device of this character which may be easily carried or placed within vehicles, such as a street car or the like when the child is not occupying the cart.

With the above and other objects in view, which will appear as the description progresses, the invention resides in the novel construction and arrangement of parts hereinafter fully described and claimed.

In the accompanying drawings there has been illustrated a simple and preferred embodiment of the improvement and in which drawings:—

Figure 1:
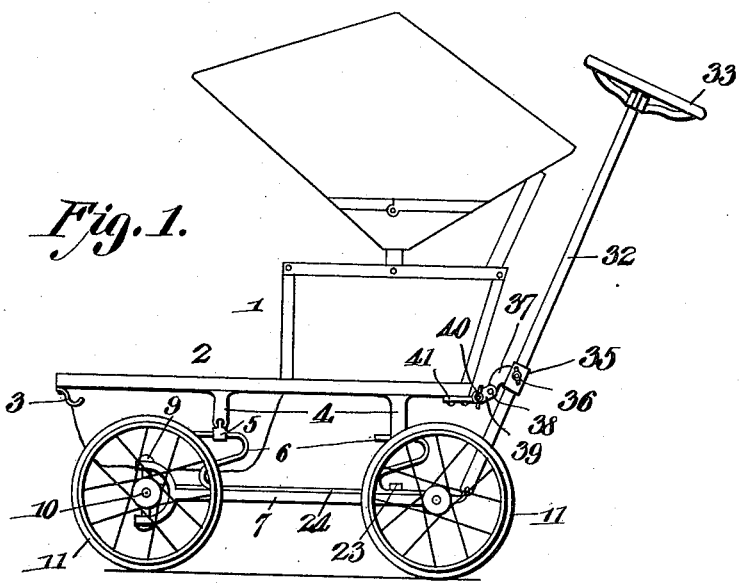
Figure 2:
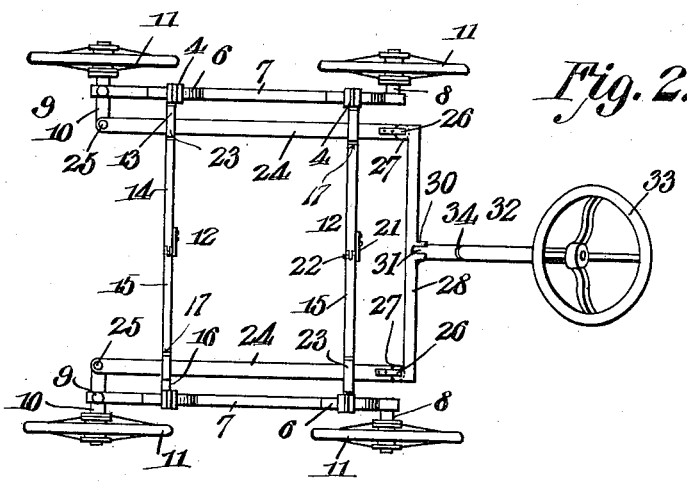
Figure 3:
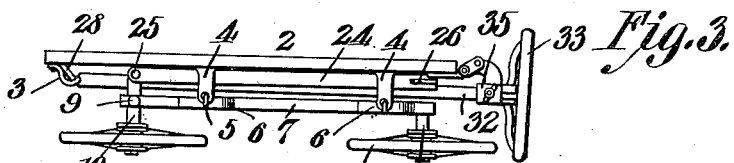
Figure 4:
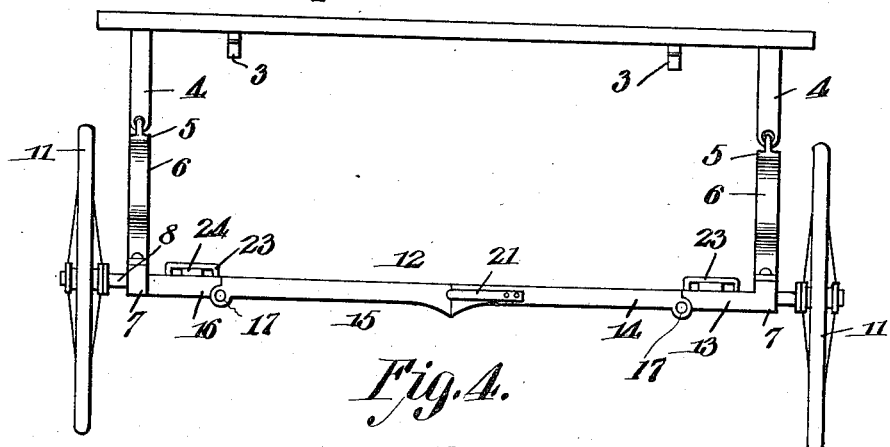
Figure 5:
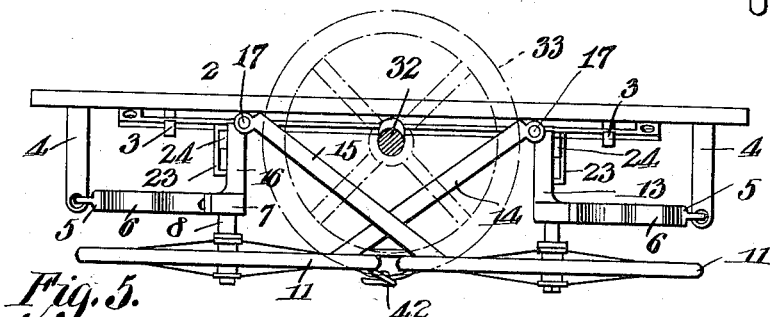
Figure 6:
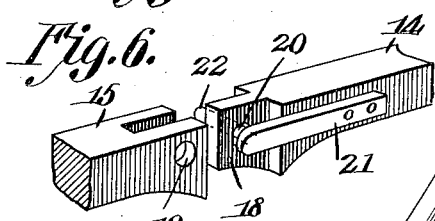
Figures 7, 8:
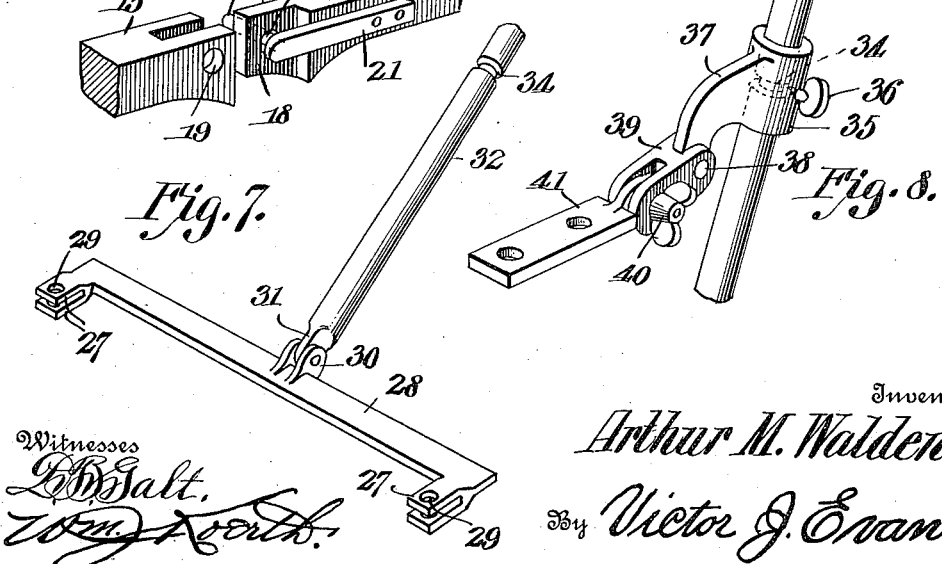

Figure 1 is a side elevation of a collapsible baby carriage provided with the improved running gear. Fig. 2 is a top plan view of the gear. Fig. 3 is a side elevation of the device folded. Fig. 4 is a rear elevation taken upon an enlarged scale, the steering mechanism being removed. Fig. 5 is a similar view, the wheels being folded under the body, the steering mechanism being positioned above the wheels and the steering post being shown in section. Fig. 6 is a detail perspective view illustrating the manner of detachably connecting the meeting ends of the members forming the transverse braces. Fig. 7 is a detail perspective view of the lower portion of the steering mechanism. Fig. 8 is a similar view illustrating the connection between the rod and the body of the carriage.

In the accompanying drawings the numeral 1 designates the body of an ordinary collapsible go-cart or carriage. This go-cart or carriage may be constructed in any desired manner, so that the parts are readily collapsed upon the frame and running gear thereof, and as the construction of the said cart or carriage does not enter the subject matter of the present invention, a detail description thereof is not deemed necessary.

The numeral 2 designates the upper frame upon which the body of the cart 1 is supported. This frame is preferably of a rectangular construction and the front connecting bar thereof has its under face formed with hooks 3, the purpose of which will presently be apparent.

The longitudinally extending side bars of the frame 2 are formed with downwardly extending lugs 4. These lugs have their lower extremities formed with eyes which are adapted to receive hanger bearings 5. Each of these hanger bearings 5 is provided with a longitudinally extending opening, the same being adapted to receive the upper member of S-shaped springs 6 provided upon the longitudinally extending side members 7 of the running gear proper. These members 7 are each connected with the short axles 8 upon the rear of the running gear and are pivotally connected as at 9 with the two axles 10 positioned upon the front of the running gear.

Connected with both the front and rear axles 10 and 8 are suitable wheels 11. Connected at spaced intervals with the side member 7 are the transversely arranged braces 12. Each of these braces is made up of a plurality of sections, four in number, and designated respectively by the numerals 13, 14, 15 and 16. The members 13 and 16 are firmly connected with the side member 7 and the members 14 and 15 are hingedly connected with the members 13 and 16 as at 17. The hinged connection between these members is of that form known as a rule hinge, so that when the members 14 and 15 are swung upon the members 13 and 16, all of the said members will be in parallel relation with each other. The members 14 are each formed with reduced extending tongues 18, while the members 15 have their extremities bifurcated to receive the said tongues.

The arms provided by the bifurcations are formed with openings 19, while the member 14 has its tongue 18 formed with a similar opening 20, the latter adapted to aline with the openings 19 when the two members or sections 14 and 15 are brought together. In order to secure the said members, the section 14 is formed with a longitudinally extending spring member 21, the same having its extremity formed with a transversely arranged stud or pin 22. By this arrangement, it will be noted that the stud or pin 22 may be readily removed from its engagement with the openings 19 and 20 by simply retracting the spring 21 when it is desired to separate the said members when the device is to be folded. It will also be noted that when the braces have all of their sections connected, the side members 7 are held rigidly and accidental breaking of the hinges of the said brace members is entirely obviated.

The members or sections 13 and 16 are each provided with bails or keepers 23 and slidably mounted within the said keepers are longitudinally extending bars 24. Each of these bars has its outer extremities pivotally connected with the front short axles 10 as at 25, while the rear ends of the said bars are reduced and provided with tongues. Each of the said tongues is perforated, and connected with the said bars 24 is a flat spring member 26. Each of these spring members has its extremities formed with a pin or stud similar to the stud 22 employed in connection with the spring 21. Adapted to fit snugly upon the tongues are the spaced ears 27 formed upon each end of a transversely extending bar 28.

The ears 27 are formed with openings 29 and the said openings are adapted to register with the openings of the tongues. When the ears are thus positioned, the pins provided upon the spring members 26 are allowed to drop within the said openings and securely connect the member 28 to the bars 24. The bar 28 is centrally provided with a pair of spaced ears 30, and pivoted between the said ears is the extremity 31 of an operating rod 32. The upper extremity of the rod 32 is provided with an end wheel 33 which, upon rotation in either direction, will swing the front short axles so as to turn the wheels connected therewith and thus guide the carriage in a desired direction.

The rod 32 is provided with a reduced circumferential cut away portion 34 and the said rod is further provided with a movable collar 35, the latter being formed with an opening adapted for the reception of a thumb nut 36 and the extension of the said thumb nut is adapted to play within the cut away portion 34 of the rod. The collar is formed with a downwardly extending ear 37. This ear is pivotally connected as at 38 with a link 39, the said link having its offset extremity pivotally connected as at 40 with a bracket 41. This bracket 41 is securely connected with the frame 2. The connection 40 comprises a bolt and thumb screw so that the link 39 may be readily disconnected from the bracket 41. It is to be understood that the pivotal connection between the ears 27 and the tongues provided upon the members 24 is sufficiently loose to allow the transverse bar 28 to swing, when the latter is turned by the rod 32 at its connection with the collar 35 and it will be readily noted that a slight movement of the wheel 33 will cause one of the members 24 to be slid rearwardly and the opposite member 24 to be slid forwardly, so that the front wheels 11 mounted upon the short axles 10 will move in unison.

From the above description, taken in connection with the accompanying drawing, the method of construction, and mode of operation in knocking down the running gear will, it is thought, be apparent to those skilled in the art to which the invention appertains. It will be noted by reference to Fig. 4 of the drawings that the springs 6, after the members or sections 14 and 15 have been disconnected, will readily fold beneath the frame 2 carrying with them the member 7 as well as the members 24. The members 14 and 15 may rest upon the wheels 11 and the wheels may be secured together through the medium of a suitable strap 42. The member 28 is disconnected from the members 24 and the link of the rod 32 is disconnected from the bracket 41. The rod and transverse bar 28 are slid above the wheels and the said transverse bar is engaged by the hooks 3.

Having thus fully described the invention, what I claim as new, is:—

1. In combination with the frame of a baby carriage, of lugs depending from the sides of the frame, hooks upon one end of the frame, S shaped springs hingedly connected with the lugs, longitudinally extending side members connected with the hooks, rear wheels having short axles secured to the side members, front wheels also provided with short axles pivotally connected with the side members, transversely arranged brace members for the side members, each of said brace members comprising four sections, opposite end sections being connected with the side members and being connected with the inner sections through the medium of a rule joint, one of the inner members being provided with a tongue, the second inner member having its extremity bifurcated to engage with the tongue, a detachable spring member for securing the ends of the intermediate sections, longitudinally extending bars pivotally connected with the short axles of the front wheels, a transverse member removably and loosely connected with each of the bars, a steering rod pivotally connected with the transverse member, said steering rod having a circumferential depression, a collar upon the rod provided with a thumb nut engaging within the depression, said collar being formed with a depending ear, a link connected with the ear, a bracket secured to the frame of the carriage and removably connected with the link, all substantially as and for the purpose set forth.

2. In combination with a frame for baby carriages, of lugs depending from said frame, said lugs being provided with eyes, hanger bearings loosely connected with the eyes, S-shaped springs hingedly connected with the hanger bearings, side members secured to the springs, short axles connected with the side members, wheels for the axle, transverse braces for the side members, each of said braces comprising a pair of hinged members, means for connecting the meeting ends of the members, rule joints for the brace members, longitudinally extending bars projecting through the keepers, said bars having their front ends pivotally connected to the front short axles, a removable transverse lever connected with the opposite ends of the bars, and a steering lever connected with the transverse bars, substantially as and for the purpose set forth.

In testimony whereof I affix my signature in presence of two witnesses.

ARTHUR M. WALDEN.

Witnesses:
THEO. H. MAURER,
FRANK ZUK.

Copies of this patent may be obtained for five cents each, by addressing the "Commissioner of Patents Washington, D. C."